US009887881B2

(12) United States Patent
Karthikeyan

(10) Patent No.: US 9,887,881 B2
(45) Date of Patent: *Feb. 6, 2018

(54) DNS-ASSISTED APPLICATION IDENTIFICATION

(71) Applicant: Cisco Technology, Inc., San Jose, CA (US)

(72) Inventor: Krishnamoorthy Karthikeyan, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/067,669

(22) Filed: Oct. 30, 2013

(65) Prior Publication Data

US 2015/0120909 A1 Apr. 30, 2015

(51) Int. Cl.
*H04L 12/24* (2006.01)
*H04L 29/12* (2006.01)
*H04L 12/26* (2006.01)

(52) U.S. Cl.
CPC ...... *H04L 41/0893* (2013.01); *H04L 61/1511* (2013.01); *H04L 41/5019* (2013.01); *H04L 43/028* (2013.01)

(58) Field of Classification Search
CPC ............................. H04L 43/04; H04L 41/0809
USPC ......................................................... 709/224
See application file for complete search history.

(56) References Cited

U.S. PATENT DOCUMENTS

| | | | |
|---|---|---|---|
| 7,457,870 B1 * | 11/2008 | Lownsbrough | H04L 41/5058 709/217 |
| 7,774,456 B1 * | 8/2010 | Lownsbrough | H04L 41/22 709/217 |
| 7,953,895 B1 | 5/2011 | Narayanaswamy et al. | |
| 8,260,914 B1 * | 9/2012 | Ranjan | 709/224 |
| 8,266,672 B2 * | 9/2012 | Moore | 726/1 |
| 2002/0122422 A1 * | 9/2002 | Kenney | H04L 41/0213 370/392 |
| 2004/0059722 A1 * | 3/2004 | Yeh et al. | 707/3 |
| 2007/0204036 A1 * | 8/2007 | Mohaban | H04L 12/66 709/224 |
| 2008/0198849 A1 * | 8/2008 | Guichard et al. | 370/392 |
| 2010/0091676 A1 * | 4/2010 | Moran | H04L 47/10 370/252 |
| 2010/0192225 A1 * | 7/2010 | Ma et al. | 726/23 |
| 2010/0217842 A1 * | 8/2010 | Shuster | 709/220 |

(Continued)

OTHER PUBLICATIONS

Zhenxiang Chen et al; "Applied Soft Computing", Oct. 17, 2008, pp. 1-10, <http://www.softcomputing.net/asoc_chen_2008.pdf>.

*Primary Examiner* — Ario Etienne
*Assistant Examiner* — Elizabeth Kassa
(74) *Attorney, Agent, or Firm* — Patterson + Sheridan, LLP

(57) ABSTRACT

Techniques are disclosed for classifying a network flow based on a domain name system (DNS) request. Embodiments receive a first DNS request associated with establishing a network flow with a remote service. Here, the first DNS request specifies a domain name associated with the remote service. The domain name is analyzed in order to determine a first classification for the remote service. The first classification is selected from a plurality of classifications. Embodiments then determine a network management policy to apply to the network flow, based on the determined first classification.

16 Claims, 6 Drawing Sheets

(56) References Cited

U.S. PATENT DOCUMENTS

| | | |
|---|---|---|
| 2012/0260331 A1 | 10/2012 | Aaron |
| 2012/0303808 A1* | 11/2012 | Xie ............................... 709/225 |
| 2013/0054960 A1 | 2/2013 | Grab et al. |
| 2013/0151496 A1* | 6/2013 | Jacobs et al. ................. 707/706 |
| 2013/0194930 A1 | 8/2013 | Szabo et al. |
| 2014/0233459 A1* | 8/2014 | Dahod ................ H04W 72/044 370/328 |

* cited by examiner

DNS-ASSISTED APPLICATION IDENTIFICATION

TECHNICAL FIELD

Embodiments presented in this disclosure generally relate to traffic classification, and more specifically to techniques for classifying data flows based on DNS requests.

BACKGROUND

Data communication in a computer network involves the exchange of data between two or more entities interconnected by communication links and subnetworks. A local area network (LAN) is an example of a subnetwork that provides relatively short-distance communication among the interconnected stations. In contrast, a wide area network (WAN) facilitates long-distance communication over links provided by public or private telecommunications facilities. The entities are typically software programs executing on hardware computer platforms which, depending on their roles within the network, may serve as end stations or intermediate stations. Examples of intermediate stations include routers, bridges and switches that interconnect communication links and subnetworks, whereas an end station may be a computer located on one of the subnetworks. More generally, an end station connotes a source of or target for data that typically does not provide routing or other services to other computers on the network.

End stations typically communicate by exchanging discrete packets or frames of data according to predefined protocols. In this context, a protocol represents a set of rules defining how the stations interact with each other to transfer data. The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. For instance, layer 2 of the OSI model is known as the data link layer and uses physical addressing (e.g., Media Access Control (MAC) addresses) for switching traffic. Layer 2 encapsulation generally provides the mechanism for transferring data between network entities, and can also be used for error correction for layer 1. As another example, layer 3 traffic is known as network layer traffic and uses logical addressing (e.g., Internet Protocol (IP) addresses) for routing traffic. Layer 3 encapsulation generally provides the mechanism for transmitting data between a source host on a first network to a destination host located on a second network.

Domain name system (DNS) is fundamental component of the Internet and is widely used today. Generally, DNS is a system that allows network resources to request IP address information relating to a particular domain name. For instance, a network resource (e.g., a computer connected to the network) can generate and transmit a DNS request to a DNS server, where the DNS request specifies a domain name associated with a remote service. The DNS server can then access a repository mapping domain names to IP addresses, and return the IP address corresponding to the specified domain name to the network entity. When the remote service's IP address changes, such a change can be pushed to the DNS server, which updates its repository accordingly. Doing so allows the network location (i.e., as indicated by the service's IP address) of the remote service to change, without affecting end users who may still continue to use the remote service's domain name.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
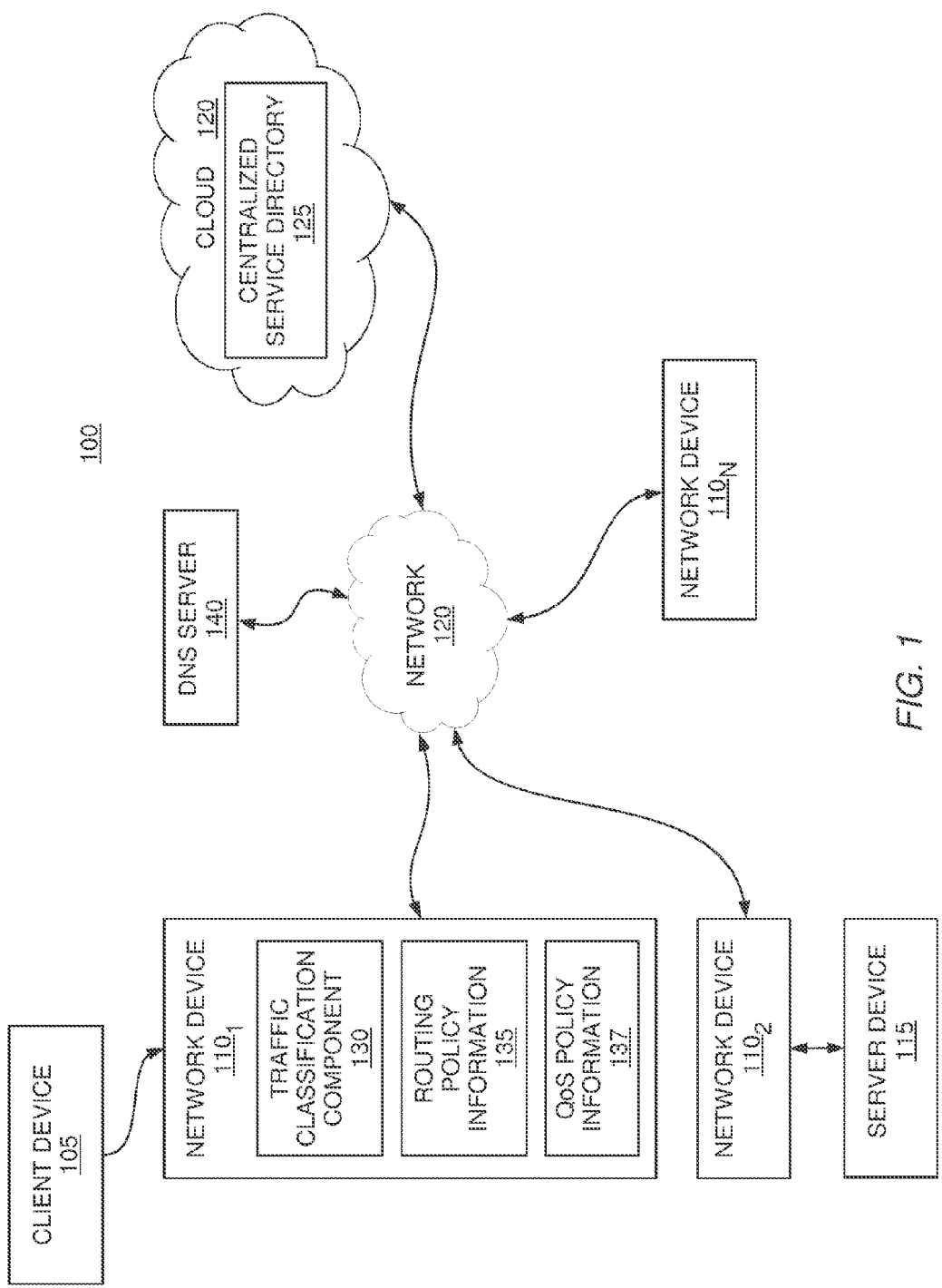
FIG. 1 illustrates a network device configured with a traffic classification component, according to one embodiment described herein.

Embodiments provide a method and network device for classifying a network flow based on DNS requests. The method and network device include receiving a request associated with establishing a network flow with a remote service. Here, the request specifies a network address associated with the remote service. Additionally, the method and network device include determining a classification of the remote service by querying a service directory using the network address. The method and network device also include determining a network management policy to apply to the network flow, based on the determined classification.

Another embodiment provides a method for classifying a network flow using a service directory. The method includes receiving a request associated with establishing a network flow with a remote service. Here, the request specifies a network address associated with the remote service. Additionally, the method includes determining a classification of the remote service by querying a service directory using the network address. In such an embodiment, the classification is determined using one of (i) no deep packet inspection analysis and (ii) a limited deep packet inspection analysis. The method also includes determining a network management policy to apply to the network flow, based on the determined classification.

Example Embodiments

A network device (e.g., a network switch) is a computer device that connects network segments. A network device may operate at one or more layers including, for example, the physical layer, the data link layer, the network layer, and/or the transport layer. While four layers are described, it is to be appreciated that in different examples a switch may operate at all seven layers of the Open Systems Interconnection (OSI) stack. For instance, a network device may inspect data packets as they are received. In doing so, the network device may determine the source and destination of a packet and forward it accordingly. Additionally, a network device may contain some intelligence beyond examine and forward logic. This intelligence facilitates having a network device perform some management functions. For example, a network device could selectively turn some port range on or off, may selectively establish and/or maintain priority settings for ports, may perform media access control (MAC) filtering to prevent MAC flooding, may use a spanning tree protocol, may perform link aggregation, and so on. Typically, when these management functions are performed, they are performed in actual (e.g., physical) network devices.

Generally, traffic flowing through a communications network may be viewed as a set of independent flows (also referred to herein as "network connections"). For instance, a flow can consist of a set of data packets that require similar treatment by the network. Flows may be defined according to a wide range of criteria to meet different needs. For instance, a flow could be the set of packets sent from one host to another or the set of packets exchanged by a pair of communicating application programs. For example, a first flow could represent the network traffic flowing between a game client and a game server. As another example, a second flow could represent the network traffic flowing between a streaming content server and a client. In general there may be many flows passing through any point in the network at any time.

In many circumstances, select flows may be considered more important or to be of a higher priority than other flows. For instance, a flow containing voice over Internet Protocol (VoIP) data could be considered a relatively high priority flow, as any delay or interruption to such a flow may directly impact a user's experience (e.g., by interrupting the user's call). As such, it may be preferable for a network device to treat such a flow as having a higher priority when allocating the network device's fixed resources amongst the flows. In addition to relative priorities between the flows, a number of quality of service (QoS) metrics may be specified for each of the flows, which specify minimum thresholds of acceptable performance for the respective flows.

Generally speaking, a number of different techniques can be used to assign priority levels and QoS requirements for each of the flows on a network device. For instance, a user (e.g., a network administrator) could manually determine this information and could manually configure the network device accordingly. Another technique for determining flow information involves deep packet inspection (DPI). As an example, for a particular flow, logic on the network device could be configured to examine the data portion within the packets of the particular flow, as well as header information within the packets, in order to determine information about the flow (e.g., a classification of the flow, such as gaming, VoIP, content streaming, etc.). The determined information could then be used for numerous flow management purposes, including prioritization, QoS requirements, security functions and so on.

However, there are several disadvantages to such DPI techniques. For instance, one disadvantage is that such DPI techniques are typically very resource intensive, and can consume a significant portion of the network device's processing and memory resources. Additionally, such an inspection using DPI techniques typically takes a substantial amount of time to complete. This can be particularly problematic when attempting to classify flows that only exist for a relatively short length of time. That is, if a flow ceases to exist before (or shortly after) it has been classified using the deep packet inspection techniques, the DPI analysis may provide no benefit to the network device, and the resources consumed by performing the DPI analysis are in essence wasted.

Additionally, the presence of encrypted traffic within data flows is becoming more prevalent. While DPI analysis techniques can help to classify flows by analyzing the content of individual packets within the flows, such techniques frequently cannot classify flows in which the content is encrypted, as the network devices do not have the requisite keys for decrypting the content. As such, it may become increasingly difficult to classify network connections using DPI techniques, as the prevalence of encrypted network traffic continues to increase.

For example, the domain name can be specified as a fully qualified domain name (FQDN). Embodiments may analyze the domain name in order to determine a classification for the remote service, wherein the classification is selected from a plurality of potential classifications. For instance, embodiments could maintain the plurality of potential classifications, where each classification is associated with one or more keywords. In such an example, embodiments could determine a word(s) (or portion of a word(s)) within the domain name, and could match the determined word(s) (or portion of a word(s)) to a keyword(s) associated with one of the plurality of potential classifications. Upon determining that the determined word(s) (or portion of a word(s)) matches the keyword(s) associated with a particular one of the potential classifications, embodiments could classify the first DNS request using the particular classification.

Upon classifying the DNS request, embodiments may determine a network management policy to apply to the network flow, based on the determined first classification. For example, embodiments could maintain routing policy information for each of the plurality of distinct classifications. Upon classifying the DNS request as a particular one of the plurality of distinct classifications, embodiments could apply the corresponding routing policy information for the particular classification to a network flow resulting from the DNS request. Doing so can enable the network device to quickly and efficiently classify and manage new network flows, even when the new network flows have a relatively short lifespan. Moreover, as embodiments classify network flows based on a DNS request, embodiments may classify the network flow regardless of whether the network flow includes encrypted data.

It is broadly contemplated that embodiments herein may be implemented on physical network devices as well as virtual network devices. Virtualization generally concerns separating a resource from underlying physical resources. Virtualization techniques can be applied to various devices and programs (e.g., computers, operating systems). These virtualization techniques can be applied to network switches as well. A virtual machine (VM) is a representation of a real machine using software that provides an operating environment that can run a host and its applications. A VM may be used to run applications and/or may be used as an appliance for a designated purpose and/or function. Even though a network switch may be virtualized, a virtual switch is typically connected in some manner to an actual, physical switch. Generally, the virtual switch provides connectivity to the physical ports of the physical switch on which the virtual switch is running (or to which the virtual switch is connected). However, one skilled in the art will appreciate that in one example a virtual switch could connect virtual machines on a single physical server and thus, in such an example, would not be connected to an actual switch.

Virtualization allows one device (e.g., a computer, a network device, etc.) to do the job of multiple devices by sharing the resources of the single device across multiple virtual environments. Generally, a VM is a tightly isolated software container that can run its own operating system and applications as if it was a physical machine. A VM generally behaves like a physical machine and has its own virtual (e.g., software-based) processor, memory, network interface card(s), and so on. However, a virtual device may be pure software and thus may be completely independent from an underlying physical hardware. Therefore, a virtual device may be migrated between different underlying physical hardware. Generally, a VM may have a number of virtual ports (also referred to as virtual interfaces) that connect to a switch (either physical or virtual).

FIG. 1 illustrates a network device configured with a traffic classification component, according to one embodiment described herein. As shown, the network environment 100 includes a plurality of network devices $110_{1-N}$ and a DNS server 140, interconnected via a network 120. Here, the network device $110_1$ is connected to a client device 105, while the network device $110_2$ is connected to a server device 115. The network device $110_1$ contains a traffic classification component 130, and predefined routing policy information 135 and QoS policy information 137. While the depicted embodiment includes both routing policy information 135 and QoS policy information 137, such a depiction is for illustrative purposes only. Moreover, other embodiments may feature a network device which only includes one of routing policy information 135 and QoS policy information 137, or neither at all. For example, another embodiment may be implemented on a network device which does not perform any routing functionality and thus may only include QoS policy information 137.

In the depicted embodiment, the network environment 100 also includes a cloud computing environment 120, which in turn contains a centralized service directory 125. Of note, although the centralized service directory 125 is shown within the cloud computing environment 120, such a depiction is provided for illustrative purposes only and without limitation. More generally, it is broadly contemplated that the centralized service directory 125 could reside within any number of different network environments, where the centralized service directory 125 is accessible by more than one network device. For example, the centralized service directory 125 could reside within an Internet service provider's network, and could be accessible by network devices configured, each configured with a traffic classification component 130, within the Internet service provider's network.

Generally, the traffic classification component 130 could be configured to classify a network flow based on a DNS request. For instance, the traffic classification component 130 could receive a DNS request associated with establishing a network flow with a remote service on the server device 115. Here, the client device 105 could transmit the DNS request to the DNS server 140, and the traffic classification component 130 could detect the DNS request by monitoring packets until the traffic classification component 130 detects a DNS request flowing through the network device $110_1$ towards the DNS server 140. The DNS request generally specifies a domain name associated with the remote service on the server device 115. For example, the domain name could be expressed as a FQDN corresponding to the server device 115.

The traffic classification component 130 could then analyze the domain name to determine a classification for the remote service. For instance, the traffic classification component 130 could match a word or a portion of a word from within the domain name to a keyword or a portion of a keyword associated with service classifications. For example, the traffic classification component 130 could maintain a plurality of distinct classifications for network flows, where each of the distinct classifications is associated with one or more keywords, and could select one of the distinct classifications based on combinations of alphanumeric characters within the domain name.

Once the traffic classification component 130 has determined the classifications, the traffic classification component 130 could determine a network management policy to apply to the network flow resulting from the DNS request, based on the determined first classification. That is, such a DNS request from the client device 105 to the remote server will generally be followed by a network connection(s) between the client device 105 and the remote server, and the traffic classification component 130 could apply the determined policy to the resulting network connection(s). For instance, the routing policy information 135 could include a policy to apply for each of the distinct classifications, and the traffic classification component 130 could apply the policy corresponding to the selected classification to the resulting network flow, once the network flow is established. Additionally, the traffic classification component 130 could determine a QoS policy to apply to the subsequent network connection(s), based on the QoS policy information 137. Here, such a QoS policy could include a traffic shaping and/or traffic blocking policy for the network connection(s).

In a particular embodiment, the traffic classification component 130 is configured to complement existing deep packet inspection (DPI) techniques. For example, the traffic classification component 130 could determine a potential classification(s) for a network flow based on the DNS request(s) associated with the network flow. The determined classification(s) could then be fed into a DPI engine as inputs. The DPI engine could then be configured to perform a deep packet inspection to classify the network flow, while considering the potential classification(s) determined based on the DNS request(s). For example, in one embodiment, the DPI engine could perform the deep packet inspection analysis to select one of the potential classifications as an actual classification for the network connection. As another example, the DPI engine could be configured to consider the input classifications as making these classifications more likely, while not restricting the DPI analysis as to only considering these classifications. Doing so can help to improve the accuracy and efficiency of the conventional DPI analysis.

In one embodiment, the traffic classification component 130 is configured to query the centralized service directory 125 in order to determine a classification for the network flow. For example, the centralized service directory 125 could maintain a centralized mapping of domain names to classifications (e.g., manually updated by one or more users). The traffic classification component 130 could then query the centralized service directory 125 with the domain name within the received DNS request, in order to determine a classification for the subsequent network flow(s) corresponding to the DNS request. In one embodiment, the traffic classification component 130 may first attempt to classify the DNS request by analyzing the domain name specified by the DNS request and attempting to map the domain name to one of a plurality of potential classifications. If the traffic classification component 130 is unable to classify the DNS request (e.g., the domain name does not sufficiently relate to one of the potential classifications), the traffic classification component 130 could query the centralized service directory 125 with the domain name, in order to retrieve a classification associated with the domain name. In one embodiment, the centralized service directory 125 could then retrieve one or more keywords associated with the classification from the centralized service directory 125, and could use such keywords for classifying subsequent DNS requests. In a particular embodiment, the centralized service directory 125 could generate the one or more keywords, based on alphanumeric characters within the domain name of the received DNS request, and could use the generated keywords for classifying subsequent DNS requests.

Figure 2:
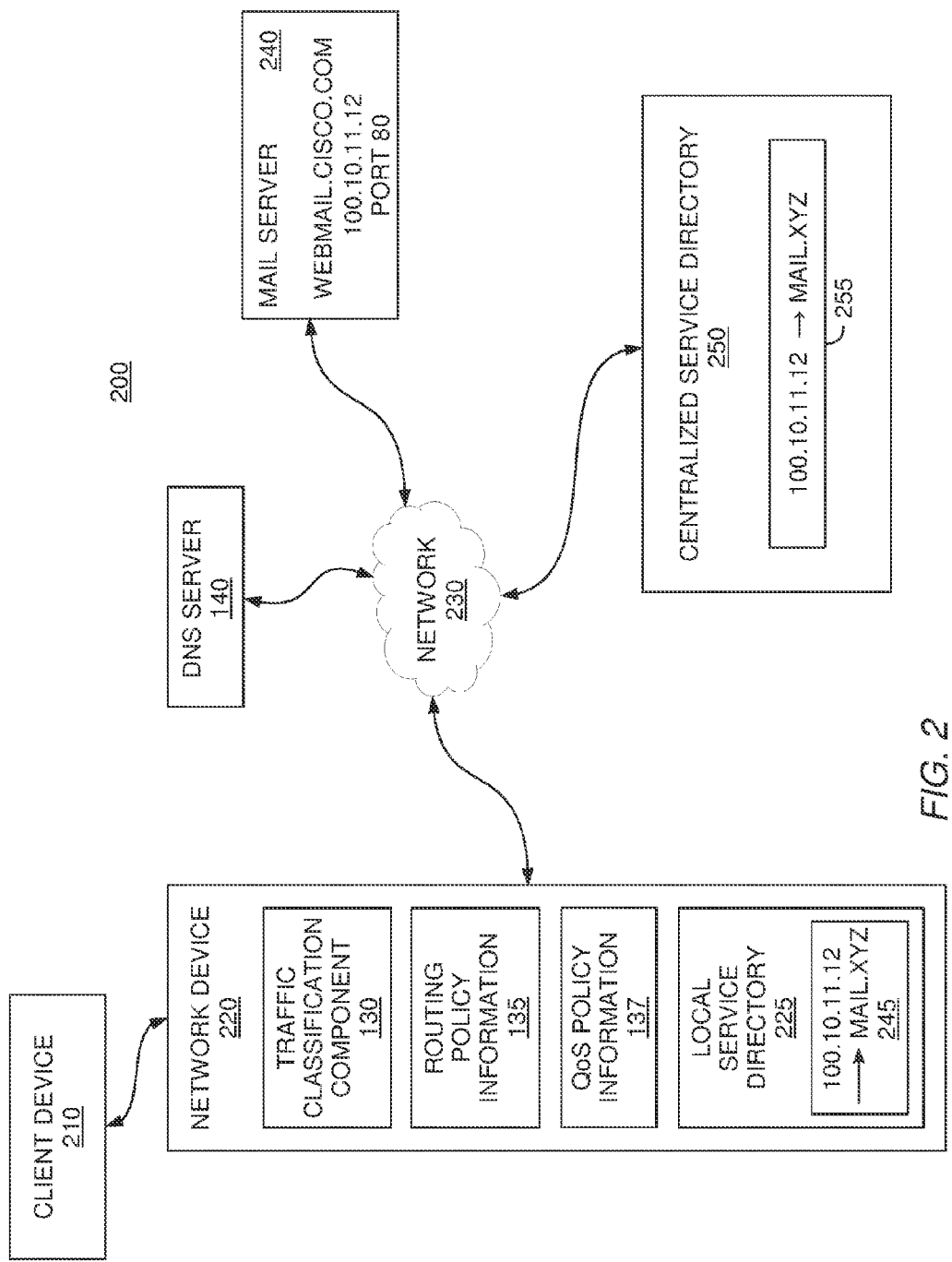
FIG. 2 illustrates a network environment including a centralized service directory and a network device configured with a traffic classification component, according to one embodiment described herein.

The traffic classification component 130 may also maintain a local service directory (not shown), in addition to (or in lieu of) the use of the centralized service directory 125. An example of such an embodiment is shown in FIG. 2, which illustrates a network environment including a centralized service directory and a network device configured with a traffic classification component, according to one embodiment described herein. As shown, the network environment 200 includes a network device 220, a mail server 240, a DNS server 140 and a centralized service directory 250, interconnected via the network 230. The network device 220 is also connected to the client device 210. In the depicted embodiment, the network device 220 includes the traffic classification component 130, routing policy information 135, QoS policy information 137 and a local service directory 225. Here, the mail server 240 (e.g., a software application) is associated with the domain name webmail.cisco.com, the internet protocol (IP) address of 100.10.11.12 and is hosted at the port "80". Additionally, the local service directory 225 (e.g., an XML file, a database, etc.) contains an entry 245, specifying that the IP address "100.10.11.12" is associated with the classification "Mail.XYZ".

In one embodiment, the entry 245 in the local service directory 225 may contain an expiration time value. Generally, the expiration time value specifies a moment in time at which the entry 245 expires and is removed from the local service directory 225. That is, as domain names and IP addresses may become associated with different services over time, the traffic classification component 130 could be configured to create records that expire after some configurable interval of time. Once a particular entry expires and is removed the service directory, the traffic classification component 130 would need to reclassify the service (e.g., based on a DNS request associated with the service) and to create a new entry for the service in the service directory. Doing so helps to avoid misclassifying network flows based on outdated service classifications within the service directory.

Here, to establish a new network connection to the mail server 240, the client device 210 may first submit a DNS request to the DNS server 140, specifying the domain name "webmail.cisco.com" associated with the mail server 240. Upon receiving the DNS request specifying the domain "webmail.cisco.com", the traffic classification component 130 could first determine whether the local service directory 225 contains an entry corresponding to this domain name. If so, the traffic classification component 130 could use a classification associated with the entry to classify the new network connection. The classification could then be used, e.g., to determine network management information for use with the new network connection. If instead the traffic classification component 130 determines that the local service directory 225 does not contain an entry associated with the domain name specified in the DNS request, the traffic classification component 130 could query the centralized service directory 250 (or a management application for the centralized service directory 250) using the domain name. Upon receiving such a query, the centralize service directory 250 (or the management application) could return the entry 255 or a portion of the entry 255 to the traffic classification component 130. Thus, in this example, the traffic classification component 130 could then classify the new network connection using the classification of "Mail.XYZ", and could apply a management policy associated with this classification to the network connection. Doing so enables the traffic classification component 130 to quickly and efficiently classify the new network connection, without the use of slower and more resource intensive deep packet inspection techniques.

Figure 3A:
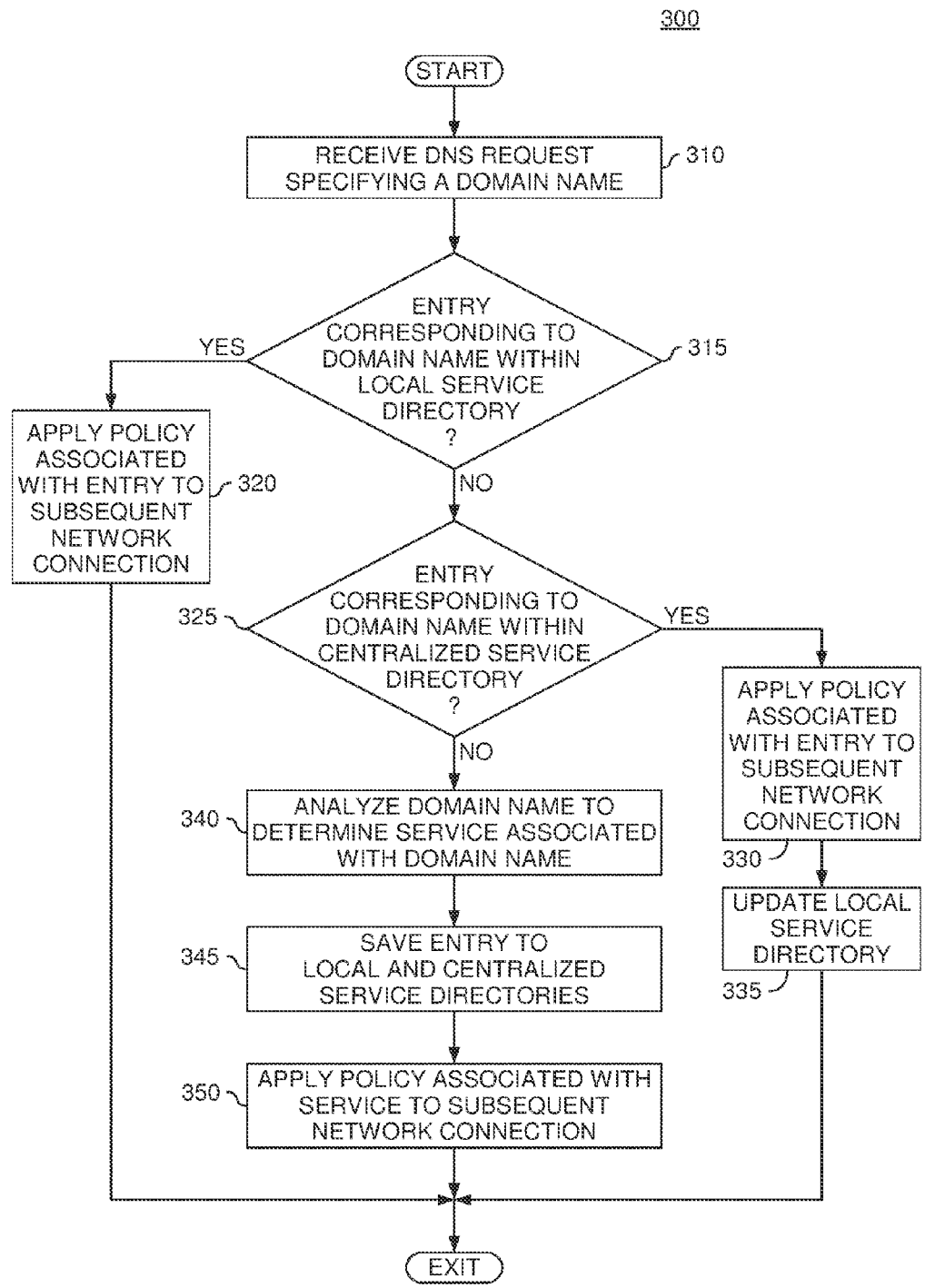
FIGS. 3A-B are flow diagrams illustrating methods for classifying network connections using DNS requests, according to embodiments described herein.
Figure 3B:
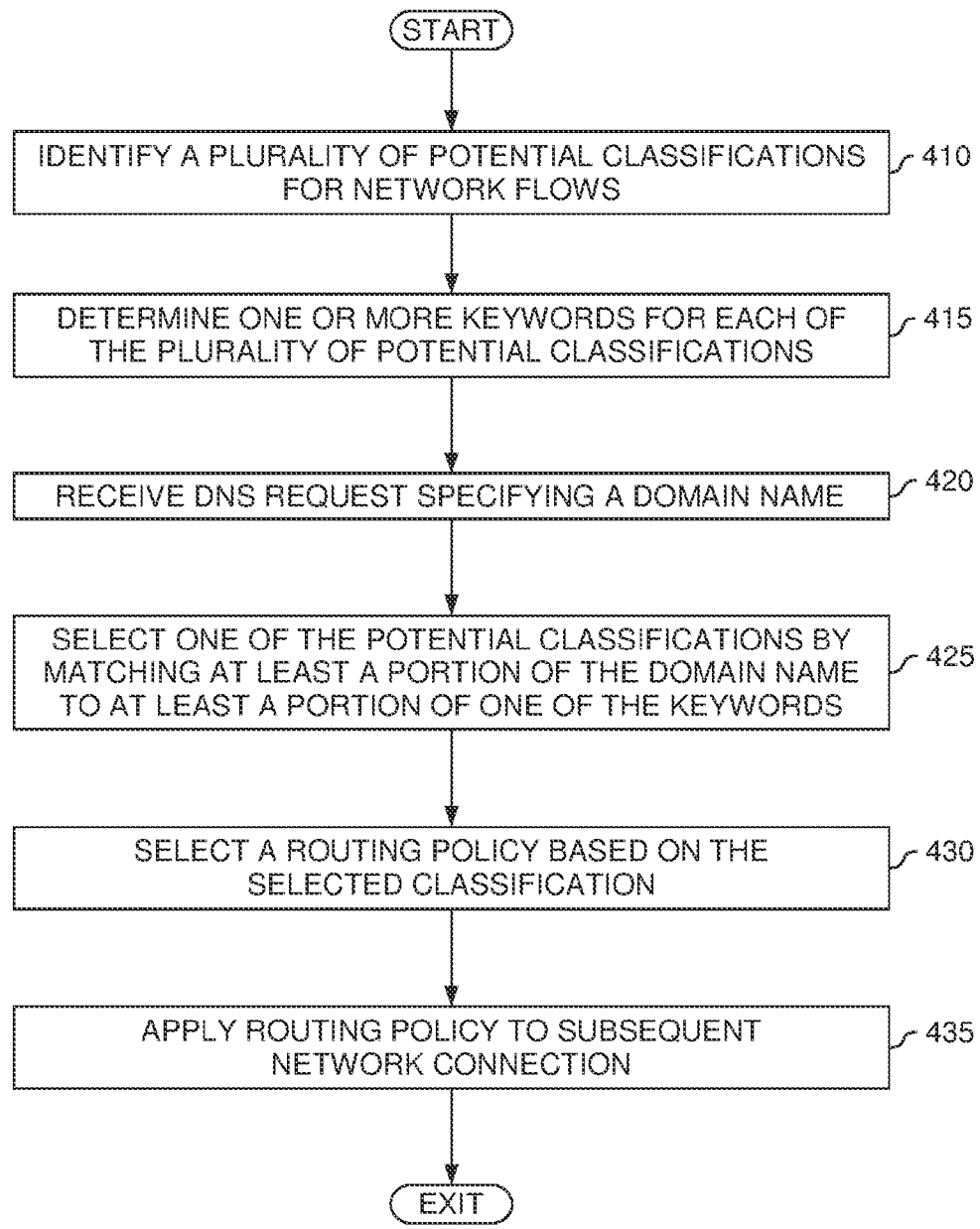

FIGS. 3A-B are flow diagrams illustrating methods for classifying network connections using DNS requests, according to embodiments described herein. As shown in FIG. 3A, the method 300 begins at block 310, where the traffic classification component 130 receives a DNS request at a first network device specifying a particular domain name. For example, the DNS request could specify the FQDN "webmail.cisco.com". Upon receiving the request, the traffic classification component 130 could determine whether an entry corresponding to the specified domain name exists within a local service directory (block 315). In this example, the local service directory represents any service directory that is local with respect to the first network device.

If the traffic classification component 130 determines an entry corresponding to the network address and port exists within the local service directory, the traffic classification component 130 could determine policy information associated with the entry in the local service directory and could apply this policy to the network connection, once the network connection is established (block 320), and the method 300 ends. For instance, such a policy could include network flow prioritization information, quality of service (QoS) information, logging information (e.g., what information should be logged, what level of detail should be logged, etc.), and so on.

In one embodiment, the local service directory comprises a plurality of entries, where each entry includes at least a domain name and a service name. For example, one such service directory could include an entry specifying "webmail.cisco.com→Mail.XYZ", where "webmail.cisco.com" is the network address (i.e., a FQDN) and "Mail.XYZ" is the service name. Upon receiving a DNS request specifying the domain name "webmail.cisco.com", the traffic classification component 130 could access the service entry and could retrieve the service name "Mail.XYZ" from the aforementioned entry.

In one embodiment, the traffic classification component 130 could also determine whether the entry within the service directory is still valid, based on an expiration time value associated with the entry. That is, entries within the service directory could be configured to expire after a predefined period of time, and the traffic classification component 130 could ensure the entry corresponding to the domain name "webmail.cisco.com" is still valid, by comparing the expiration time value within a current measure of time. The traffic classification component 130 could then determine whether predefined network policy information exists for the service name "Mail.XYZ". If so, the traffic classification component 130 could apply the existing network policy information to the new network connection. If not, the traffic classification component 130 could create a network policy to use with this service (e.g., based on a default policy, based on other policies associated with similar services such as other gaming services, and so on), and could apply the created network policy to the new network connection.

On the other hand, if the traffic classification component 130 determines that no entry currently exists for the specified address and port within the local service directory, the traffic classification component 130 could determine whether such an entry exists within a centralized service directory (block 325). Generally, the centralized service directory could be maintained and accessed by multiple traffic classification components, residing on multiple different network devices. For instance, an application could be configured to receive queries specifying domain names from the various traffic classification components. Upon receiving such a query, the application could access the centralized service directory and could retrieve any entry (or entries) in the centralized service directory corresponding to the specified domain name. The application could then return the retrieved entry (or entries) to the traffic classification component 130 from which the query was received, or could return a message indicating that no entries were found. In one embodiment, the centralized service directory is hosted in a cloud computing environment.

If the traffic classification component 130 determines that an entry exists within the centralized service directory for the specified domain name, the traffic classification component 130 determines policy information (e.g., routing policy information, QoS policy information, etc.) associated with the entry in the local service directory and applies this policy to the network connection, once the network connection is established (block 330). In the depicted embodiment, the traffic classification component 130 also updates the local service directory based on the information retrieved from the centralized service directory (block 335), and the method 300 ends. By updating the local service directory, the traffic classification component 130 can operate more efficiently by minimizing the number of queries issued to the centralized service directory.

If instead the traffic classification component 130 determines that no entry for the network address and port identifier exists within the centralized service directory, the traffic classification component 130 analyzes the domain name specified within the DNS request to classify the new network connection (block 340). For example, the traffic classification component 130 could maintain a set of rules that map domain name patterns to service names, and could use such rules to classify the domain name specified in the DNS request. For example, the traffic classification component 130 could be configured with a rule having the DNS pattern "mail.*cisco" and the application name "Mail.XYZ". Upon detecting the DNS request specifying the domain name "webmail.cisco.com", the traffic classification component 130 could determine that this domain name matches the DNS pattern "mail.*cisco".

The traffic classification component 130 could then detect a subsequent network connection being established between the device submitting the DNS request and the service associated with the domain name specified in the DNS request. For example, the traffic classification component 130 could determine that the client device 210 submitted a DNS request specifying the domain name "webmail.cisco.com" corresponding to the mail server 240, and could further determine that this domain name matches the service name "Mail.XYZ." The traffic classification component 130 could then detect a subsequent network connection being created between the client device 210 and the mail server 240, and could apply a routing policy and/or a QoS policy associated with the service name "Mail.XYZ" to the subsequent network connection. Doing so enables the traffic classification component 130 to classify the network connection, even if the network connection contains encrypted traffic that cannot be properly analyzed using deep packet inspection techniques.

In one embodiment, the traffic classification component 130 is configured to complement existing deep packet inspection (DPI) techniques using the classification determined based on the DNS request. For example, the traffic classification component 130 could determine a potential classification(s) for a network connection based on the DNS request(s) associated with the network connection. The determined classification(s) could then be fed into a DPI engine as inputs, for use in determining a classification for the network connection based on a DPI analysis. For example, the DPI engine could be configured to apply a DPI analysis to packets of the network connection and to select one of the potential classifications based on the results of the analysis. Doing so can help to improve the accuracy and efficiency of the conventional DPI analysis.

Once the classification for the network connection is determined, the traffic classification component 130 saves the classification to the local service directory and the centralized service directory (block 345). Doing so allows the traffic classification component 130 (on the current network device and, in the case of the centralized service directory, other network devices as well) to identify subsequent instances of this type of network connection more easily. In one embodiment, the traffic classification component 130 is configured to update the service directory with a mapping of the specified domain name (e.g., "webmail.cisco.com") to the determined classification (e.g., "Mail.XYZ"). In another embodiment, the traffic classification component 130 is configured to update the service directory with a mapping of an IP address corresponding to the specified domain name (e.g., "100.10.11.12" in FIG. 2) to the determined classification. Additionally, as discussed above, the centralized service directory may reside in, without limitation, a cloud computing environment, a service provider's network, a private network (e.g., a local area network or a wide area network), and so on. Of note, in one embodiment, the traffic classification component 130 is configured to not use a centralized service directory, but rather to maintain only a local service directory. In some embodiments, the traffic classification component 130 may be configured to operate without a local service directory or a centralized service directory.

Returning to the depicted embodiment, the traffic classification component 130 also determines policy information associated with the entry in the local service directory and applies this policy to the network connection (block 350). Once the policy has been applied, the method 300 ends. By classifying the network connection based on the domain name specified with the DNS request associated with creating the network connection, the traffic classification component 130 can classify network connections, even when the network connections are secure sessions containing encrypted network traffic that cannot be analyzed by conventional packet inspection techniques.

In one embodiment, the traffic classification component 130 is also configured to collect and store other information pertaining to the new network connection in the service directory. For example, such other information could include version information pertaining to the service name (e.g., for use as a sub-classification of the network flow), and virtual routing and forwarding (VRF) information associated with the network flow. The service directory could also include historical performance information, such as an average throughput associated with the network connection, a variance in throughput associated with the network connection, a time at which the connection was established, and so on. The traffic classification component 130 could then use such other information in classifying subsequent network connections. In particular, in the event that the specified domain name matches multiple DNS patterns, or in the event that the domain name does not perfectly match any of the DNS patterns, the traffic classification component 130 could use this other information to distinguish between the multiple matching patterns or to select one of the DNS patterns that best matches the network connection.

An example of this will now be discussed with respect to FIG. 3B, which is a flow diagram illustrating a method for classifying network connections using DNS requests, according to one embodiment described herein. As shown, the method 400 begins at block 410, where the traffic classification component 130 identifies a plurality of potential classifications for network flows. For instance, the traffic classification component 130 could maintain a plurality of pattern-based rules for classifying DNS requests into a plurality of potential service classifications. Here, each of the potential classifications could represent a service name, and each of the services names could be associated with a respective routing profile. As discussed above, such a routing profile could specify network flow prioritization information, QoS information, logging information, and so on.

Additionally, the traffic classification component 130 determines one or more keywords for each of the plurality of potential classifications (block 415). As discussed above, the traffic classification component 130 could be configured to maintain a set of DNS patterns, each of which corresponds to a particular service name. For instance, the traffic classification component 130 could maintain a first pattern of "mail.*cisco" to the service name "Mail.XYZ" and could maintain a second pattern of "webex" to the service name "WebEx".

In the depicted embodiment, the traffic classification component 130 then receives a DNS request specifying a particular domain name (block 420). For purposes of this example, assume that the DNS request specifies the FQDN of "webex.cisco.com". In the method 400, the traffic classification component 130 then selects one of the potential classifications by matching at least a portion of the domain name to at least a portion of one of the keywords (block 425). For example, the traffic classification component 130 could determine that the specified domain name of "webex.cisco.com" matches the pattern of "webex", as specified in the pattern-based rule for the service name "WebEx." Accordingly, the traffic classification component 130 could classify the DNS request and the resulting network connection(s) associated with the DNS request as pertaining to the "WebEx" service.

Once the DNS request is classified, the traffic classification component 130 selects a routing policy to apply to the resulting network connection(s) based on the determined classification (block 430). That is, as the DNS request is a network message that is generally transmitted by a client device, in preparation for the client device connecting to a remote server (i.e., to determine an IP address corresponding to the remote server), the traffic classification component 130 could determine one or more subsequent network connections between the client device and the remote server that follow the DNS request and could apply the selected routing policy to such network connections. For instance, the traffic classification component 130 could be configured to apply a particular QoS policy to network connections having the "WebEx" classification that helps to ensure such network connections operate properly within the network environment. Upon detecting such a subsequent network connection(s) between the client device and the remote server, the traffic classification component 130 then applies the determined routing policy to the subsequent network connection(s) associated with the DNS request (block 435), and the method 400 ends.

The traffic classification component 130 could also use metadata and other information pertaining to domain name specified in the DNS request in order to properly classify the new network connection. For example, the domain name could match two different pattern-based rules, and the traffic classification component 130 could maintain information specifying that a first one of the pattern-based rules was previously associated with network connections having a relative high average throughput and the second pattern-based rule was previously associated with network connections having a relatively low average throughput. In such an example, the traffic classification component 130 could then monitor the new network connection and could determine whether its average throughput best matches the first rule or the second rule, and could select one of the first and second rules based at least in part on this determination. By considering attributes of the subsequent networking connection in classifying the network connection, the traffic classification component 130 may more accurately classify network connections in scenarios where the pattern-based rules do not clearly identify a particular classification (e.g., in the event a particular domain name matches two or more different patterns).

Figure 4:
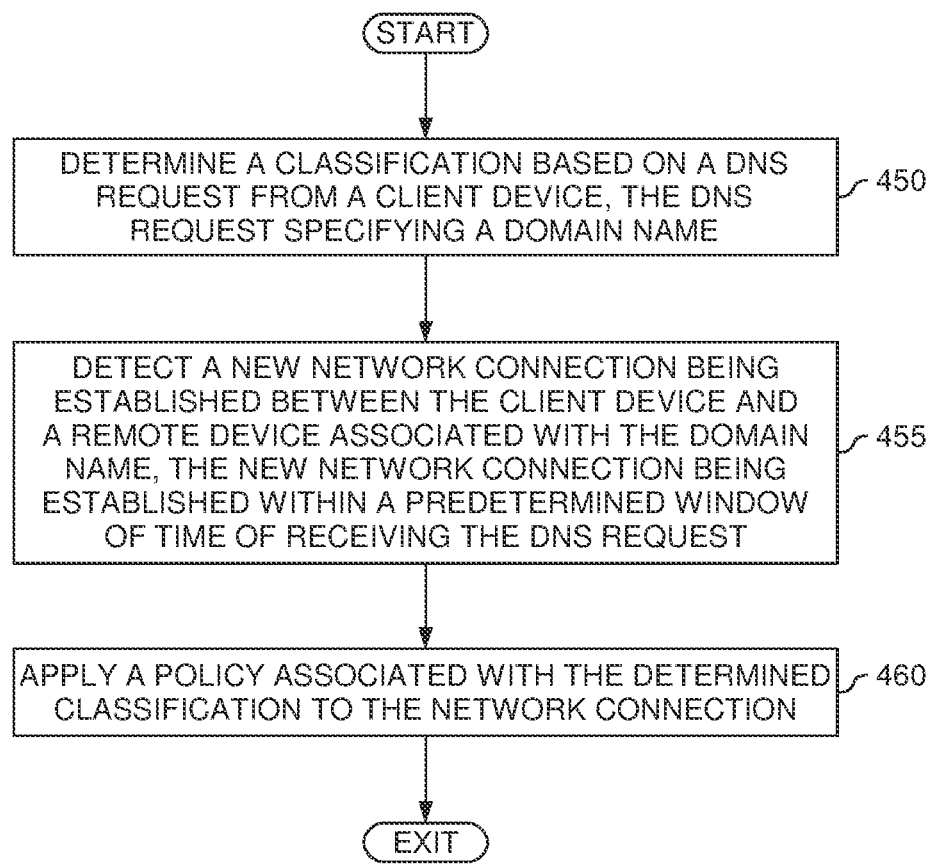
FIG. 4 is a flow diagram illustrating a method for applying a determined classification to a resulting network connection, according to one embodiment described herein.

FIG. 4 is a flow diagram illustrating a method for applying a determined classification to a resulting network connection, according to one embodiment described herein. As shown, the method 440 begins at block 450, where the traffic classification component 130 determines a classification based on a DNS request from a client device, the DNS request specifying a domain name. For example, without limitation and as discussed above, the traffic classification component 130 could determine the classification using the method 300 shown in FIG. 3A or the method 400 shown in FIG. 3B. Additionally, in one embodiment, the traffic classification component 130 could determine a number of potential classifications based on the domain name specified in the DNS request, and could use these potential classifications as input for a DPI engine in order to determine a final classification.

Returning to the method 440, the traffic classification component 130 then monitors for and detects a new network connection being established between the client device and a remote device associated with the domain name (block 455). Here, the traffic classification component 130 is configured to detect a new network connection between the client device and the remote device that is established within a predetermined window of time of receiving the DNS request. The predetermined window of time may be configured based on an estimated maximum amount of time between a DNS request and the establishment of a related network connection. That is, a new network connection between the client and remote devices that is established immediately after the DNS request was detected is highly likely to be related to the DNS request. On the other hand, a new network connection that is established a significant period of time after the DNS request was detected is unlikely to be associated with the DNS request.

Upon detecting the new network connection, the traffic classification component 130 applies a policy associated with the determined classification to the new network connection (block 460), and the method 440 ends. For example, the policy could be a QoS policy that specifies traffic shaping and/or traffic blocking for the new network connection. Additionally, or alternatively, the traffic classification component 130 could apply a routing policy to the new network connection. Doing so enables the traffic classification component 130 to classify network connections in an efficient and accurate manner.

Figure 5:
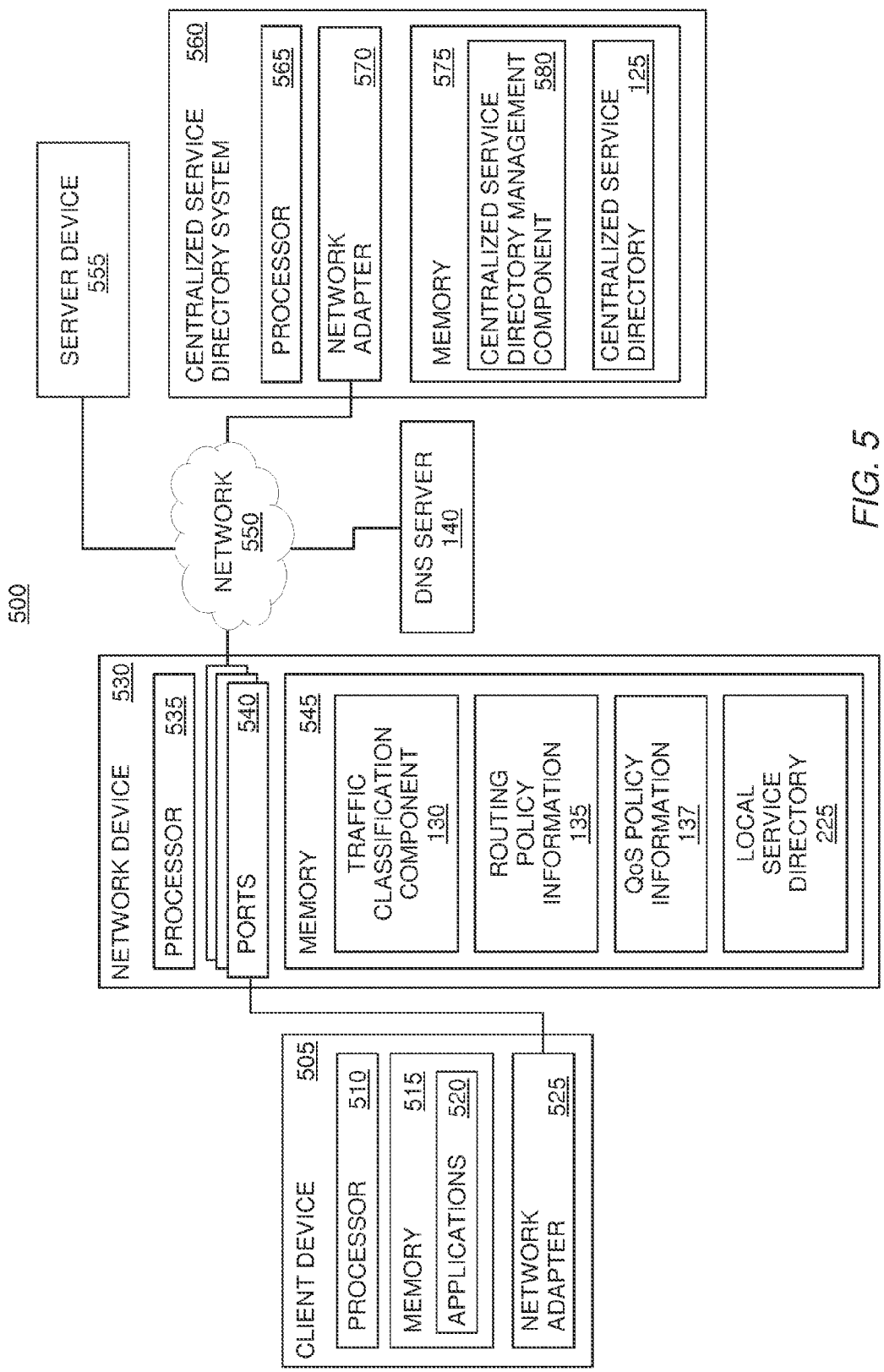
FIG. 5 illustrates a network configured with a traffic classification component, according to one embodiment described herein.

FIG. 5 illustrates a network configured with a traffic classification component, according to one embodiment described herein. The network 500 includes a client device 505, coupled to a network device 530. The client device 505 includes a processor 510, memory 515, and network adapter 525. The processor 510 may be any processing element capable of performing the functions described herein. The processor 510 represents single processor, multiple processors, a processor with multiple cores, and combinations thereof. The memory 515 may be, e.g., volatile or non-volatile memory, and may represent RAM, flash, cache, disk drives and the like. Although shown as a single entity, the memory 515 may be divided into different memory storage elements such as RAM and one or more hard disk drives. Here, the memory 515 includes applications 520. Generally, the applications 520 represent any software and/or firmware configured to initiate the establishment of a network flow with a remote service. Examples of such applications include, without limitation, a gaming client, a VoIP client, a content streaming client, a VPN client, and so on. The network adapter 525 facilitates communication between the network device 530 and the client device 505. The network adapter 525 may use either wired or wireless communication techniques to transmit data to, and receive data from, the network device 530. While the network device 530 is depicted as directly connected to network adapter 525 for the client 505, such a depiction is for illustrative purposes only, and more generally any number of intermediary network devices may be located between the client device 505 and the network device 530.

The network device 530 includes a processor 535, communication ports 540, and memory 545. The processor 535 may be any processing element capable of performing the functions described herein. The processor 535 represents a single processor, multiple processors, a processor with multiple cores, and combinations thereof. The memory 545 may be either volatile or non-volatile memory and include, RAM, flash, cache, disk drives and the like. The memory 545 contains a traffic classification component 130, routing policy information 135, QoS policy information 137 and a local service directory 225. Generally, the DNS server 140 is configured to maintain a database of domain names and addresses for various hosts (e.g., Internet hosts).

As discussed above, the traffic classification component 130 is generally configured to identify a new network flow passing through the network device 530, based on a domain name specified within a DNS request corresponding to the network flow. For instance, the traffic classification component 130 could be configured to use a set of pattern-based rules to classify the domain name as one of a plurality of potential service classifications, and the traffic classification component 130 could then apply a policy (e.g., from the routing policy information 135, from the QoS policy information 137, etc.) to the network connection(s) resulting from the DNS request, based on the determined classification. Moreover, the memory 545 could also contain network logic—e.g., a content addressable memory—for forwarding data in the communication network 600. The device 530 may also include a control plane for configuring and managing the forwarding logic.

In the depicted example, the network device 530 is communicatively coupled to a server device 555, a DNS server 140 and a centralized service directory system 560 via a network 550. Generally, the server device 555 represents any device that one of the applications 520 can establish a network flow with. For example, in an embodiment where the client device 505 represents a content player hosting a playback application 520, the server device 555 could represent a streaming content server to which the playback application 520 connects (e.g., via a TCP connection). The DNS server 140 generally represents any system and/or software service configured to process DNS requests (e.g., by returning an IP address corresponding to a domain name specified in the DNS request).

As shown, the centralized service directory system 560 includes a processor 565, memory 575, and network adapter 570. The processor 565 may be any processing element capable of performing the functions described herein. The processor 565 represents single processor, multiple processors, a processor with multiple cores, and combinations thereof. The memory 575 may be either volatile or non-volatile memory and include, RAM, flash, cache, disk drives and the like. Although shown as a single entity, the memory 575 may be divided into different memory storage element such as RAM and one or more hard disk drives. Here, the memory 575 includes a centralized service directory management component 580 and a centralized service directory 125. The network adapter 570 facilitates communication between the centralized service directory system 560 and the network 550. The network adapter 570 may use either wired or wireless communication techniques to transmit data to, and receive data from, the network 550.

Generally, centralized service directory management component 580 could be configured to receive queries and to process the queries using the centralized service directory 125. For instance, the traffic classification component 130 could submit a query to the centralized service directory management component 580, where the query includes a domain name associated with a DNS request. The centralized service directory management component 580 could then process the query by retrieving an entry in the centralized service directory 125 that corresponds to the specified domain name, and returning the entry to the traffic classification component 130. Additionally, the centralized service directory management component 580 could be configured to receive requests from any number of other traffic classification components 130 residing on other network devices (not shown). Doing so allows a number of different network devices to share and collectively manage a centralized service directory, which in turn may result in a more accurate service directory.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, the centralized service directory system 560 could be a virtual machine located in a data center for the cloud. Multiple traffic classification components 130 (e.g., residing on the network device 530 and other network devices, not shown), both within and outside of the cloud, could be configured to query and collectively manage the centralized service directory stored within the cloud. Doing so helps to ensure efficient utilization of service module resources in the data centers for the cloud.

While the previous discussion is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method, comprising:
receiving, from a client device, a first domain name system (DNS) request associated with establishing a network flow with a remote service, wherein the first DNS request specifies a domain name associated with the remote service;
analyzing, by operation of one or more computer processors, the domain name in order to determine, for the remote service, two or more potential classifications of a plurality of potential classifications, based on the domain name matching two or more of a plurality of pattern-based rules;
monitoring, for a predetermined period of time after receiving the first DNS request, the network flow between the client device and the remote service;
determining a classification for the remote service, by performing a limited deep packet inspection of the network flow to select the classification for the network flow as one of the plurality of potential classifications, wherein the limited deep packet inspection excludes all potential classifications not in the determined two or more potential classifications;
determining a network management policy to apply to the network flow, based on the determined classification of the first classification, wherein the network management policy specifies a priority of the network flow relative to other network flows and at least one quality of service (QoS) requirement for the network flow; and
applying the network management policy to the network flow.

2. The method of claim 1, wherein analyzing the domain name in order to determine a first classification for the remote service further comprises:
analyzing the domain name to determine at least a portion of a first word contained within the domain name; and
matching the at least a portion of the first word to at least a portion of a second word, the second word associated with the first classification.

3. The method of claim 1, further comprising:
saving, in a service directory, the first classification in association with the domain name specified in the first DNS request.

4. The method of claim 3, further comprising:
receiving a second DNS request associated with establishing a second network flow with the remote service, wherein the second DNS request specifies the domain name associated with the remote service;
querying the service directory using the domain name specified in the second DNS request, in order to retrieve the saved first classification; and
determining the network management policy to apply to the second network flow, based on the retrieved first classification.

5. The method of claim 3, wherein the service directory further specifies at least one of (i) version information, (ii) historical performance information, and (iii) virtual routing and forwarding (VRF) information, associated with the network flow.

6. The method of claim 1, further comprising:
  querying a local service directory using the domain name specified in the first DNS request to determine the first classification of the remote service; and
  upon determining that the local service directory does not contain an entry corresponding to the domain name:
    querying a centralized service directory to determine the first classification of the remote service; and
    updating the local service directory, based on the querying of the centralized service directory.

7. The method of claim 1, wherein analyzing the domain name further comprises:
  determining a first pattern-based rule, of a plurality of pattern-based rules, having a corresponding pattern that is satisfied by the domain name specified within the first DNS request, wherein each of the plurality of pattern-based rules has a respective pattern; and
  determining that the first pattern-based rule is associated with the first classification for the remote service.

8. A network device, comprising:
  a processor; and
  a memory containing a program that, when executed by the processor, performs an operation comprising:
    receiving, from a client device, a first domain name system (DNS) request associated with establishing a network flow with a remote service, wherein the first DNS request specifies a domain name associated with the remote service;
    analyzing the domain name in order to determine, for the remote service, two or more potential classifications of a plurality of potential classifications, based on the domain name matching two or more of a plurality of pattern-based rules;
    monitoring, for a predetermined period of time after receiving the first DNS request, the network flow between the client device and the remote service;
    determining a classification for the remote service, by performing a limited deep packet inspection of the network flow to select the classification for the network flow as one of the plurality of potential classifications, wherein the limited deep packet inspection excludes all potential classifications not in the determined two or more potential classifications; and
    determining a network management policy to apply to the network flow, based on the determined classification of the first classification, wherein the network management policy specifies a priority of the network flow relative to other network flows and at least one quality of service (QoS) requirement for the network flow.

9. The network device of claim 8, wherein analyzing the domain name in order to determine a first classification for the remote service further comprises:
  analyzing the domain name to determine at least a portion of a first word contained within the domain name; and
  matching the at least a portion of the first word to at least a portion of a second word, the second word associated with the first classification.

10. The network device of claim 8, the operation further comprising:
  saving, in a service directory, the first classification in association with the domain name specified in the first DNS request.

11. The network device of claim 10, the operation further comprising:
  receiving a second DNS request associated with establishing a second network flow with the remote service, wherein the second DNS request specifies the domain name associated with the remote service;
  querying the service directory using the domain name specified in the second DNS request, in order to retrieve the saved first classification; and
  determining the network management policy to apply to the second network flow, based on the retrieved first classification.

12. The network device of claim 10, wherein the service directory further specifies at least one of (i) version information, (ii) historical performance information, and (iii) virtual routing and forwarding (VRF) information, associated with the network flow.

13. The network device of claim 8, the operation further comprising:
  querying a local service directory using the domain name specified in the first DNS request to determine the first classification of the remote service; and
  upon determining that the local service directory does not contain an entry corresponding to the domain name:
    querying a centralized service directory to determine the first classification of the remote service; and
    updating the local service directory, based on the querying of the centralized service directory.

14. The network device of claim 8, wherein analyzing the domain name further comprises:
  determining a first pattern-based rule, of a plurality of pattern-based rules, having a corresponding pattern that is satisfied by the domain name specified within the first DNS request, wherein each of the plurality of pattern-based rules has a respective pattern; and
  determining that the first pattern-based rule is associated with the first classification for the remote service.

15. A computer program product, comprising:
  a non-transitory computer-readable medium containing computer code that, when executed by a processor, performs an operation comprising:
    receiving, from a client device, a first domain name system (DNS) request associated with establishing a network flow with a remote service, wherein the first DNS request specifies a domain name associated with the remote service;
    analyzing the domain name in order to determine, for the remote service, two or more potential classifications of a plurality of potential classifications, based on the domain name matching two or more of a plurality of pattern-based rules;
    monitoring, for a predetermined period of time after receiving the first DNS request, the network flow between the client device and the remote service;
    determining a classification for the remote service, by performing a limited deep packet inspection of the network flow to select the classification for the network flow as one of the plurality of potential classifications, wherein the limited deep packet inspection excludes all potential classifications not in the determined two or more potential classifications; and
    determining a network management policy to apply to the network flow, based on the determined classification of the first classification, wherein the network management policy specifies a priority of the network flow relative to other network flows and at least one quality of service (QoS) requirement for the network flow.

16. The computer program product of claim 15, the operation further comprising:
monitoring, for a predetermined period of time after receiving the first DNS request, for the network flow between the client device and the remote service; and
upon detecting that the network flow has been established, applying the network management policy to the network flow.

\* \* \* \* \*